April 5, 1949.

H. B. CARBON 2,466,375

AUTOMATIC SHUTOFF VALVE FOR FLUID
PRESSURE OPERATED DEVICES

Filed June 6, 1945

Inventor.
Harry B. Carbon
By Mason, Porter & Diller
Attorneys.

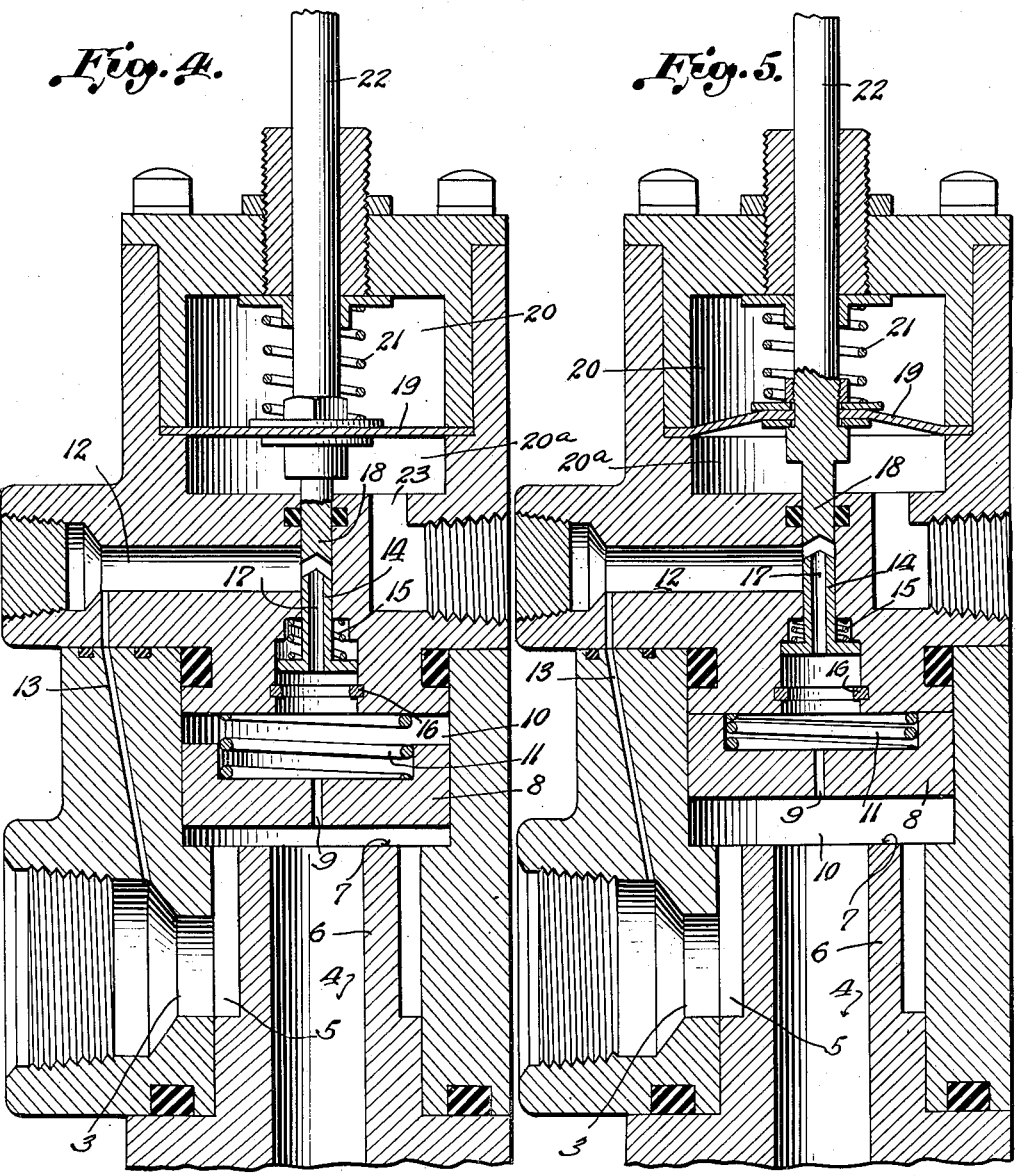

Patented Apr. 5, 1949

2,466,375

UNITED STATES PATENT OFFICE 2,466,375

AUTOMATIC SHUTOFF VALVE FOR FLUID PRESSURE OPERATED DEVICES

Harry B. Carbon, Cleveland, Ohio, assignor to The Parker Appliance Company, Cleveland, Ohio, a corporation of Ohio Application June 6, 1945, Serial No. 597,830

7 Claims. (Cl. 121—47)

The invention relates to new and useful improvements in an automatic shut-off valve for closed circuit fluid pressure operated devices, and more particularly to a shut-off valve which depends on the return flow for proper operation.

An object of the invention is to provide an operating means for a shut-off valve wherein the valve is initially opened by the direct action of fluid pressure thereagainst when a selector valve is open for directing fluid pressure to a part to be operated thereby.

A further object of the invention is to provide a shut-off valve of the above type wherein the valve is maintained open by fluid pressure.

A further object of the invention is to provide a shut-off valve of the above type wherein the valve is closed when the flow of fluid from the exhaust or return flow line of the operated part ceases.

These and other objects will in part be obvious and will in part be hereinafter more fully disclosed.

In the drawings:

Figure 4 is a view showing the initial opening of the valve when a selector valve is open and a demand is created for fluid pressure to actuate a movable part.

Figure 5 is a view similar to Figure 4, but showing the valve moved to full open position and maintained in full open position by the return flow of fluid from the discharge of the operated part.

Figure 1:
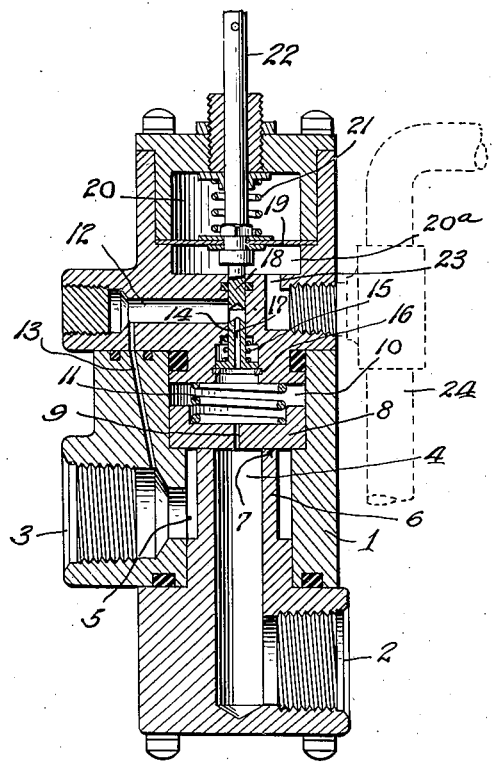
Figure 1 is a vertical sectional view of the improved shut-off valve showing the valve maintained in closed position by fluid pressure when the selector valves are closed and there is no demand for fluid flow.

The automatic shut-off valve includes a valve casing having a fluid pressure inlet 2 and a fluid pressure outlet 3. A passage 4 is connected to the inlet 2 and a passage 5 is connected to the outlet 3. This passage 5 is in the form of an annular chamber surrounding the passage 4 and separated therefrom by an annular wall 6, which is provided at its upper end with a valve seat 7. A valve 8 is adapted to engage said valve seat and closes the connection between the passages 4 and 5.

The valve 8 has a relatively small passage 9 centrally therethrough. Above the valve, as viewed in Figure 1, there is a chamber 10 in which a spring 11 is disposed, said spring bearing at its lower end against the valve and at its upper end against an abutment which is rigid with the valve housing or casing 1. This spring normally presses the valve toward the seat 7. The casing 1 is made in two parts to facilitate assembly of the valves.

Figure 2:
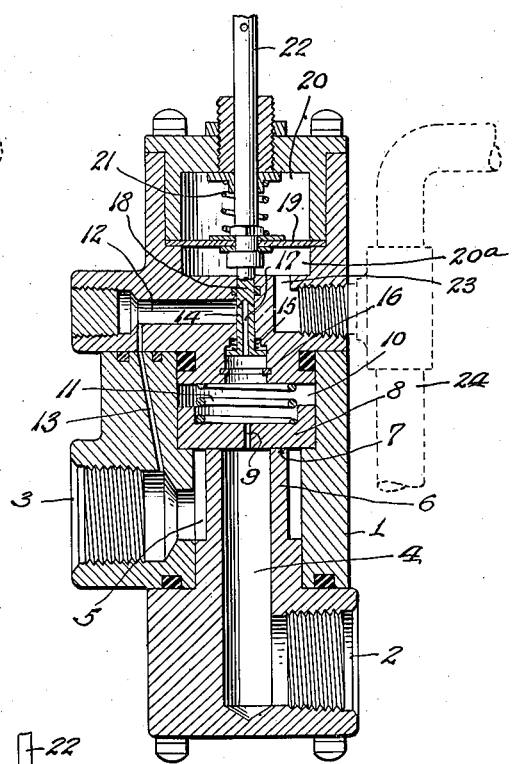
Figure 2 is a view similar to Figure 1, but showing the valve moved to closed position by fluid pressure on the line when the fluid flow returning from the discharge of an operated part ceases.

In the upper section of the valve casing there is an auxiliary outlet 12 which is connected by the passage 13 to the main outlet 3. Disposed between the auxiliary outlet 12 and the chamber 10 is an auxiliary valve 14, which will be referred to hereinafter as a pilot valve. This pilot valve is mounted for limited reciprocation in the upper section of the casing. A spring 15 moves the pilot valve downward until it rests on a stop ring 16. There is a passage 17 centrally through the pilot valve. This passage is slightly larger than the passage 9 through the main valve. Associated with the pilot valve is a movable valve seat 18. This movable valve seat 18 is connected to a diaphragm 19 extending across the chamber 20. Spring 21 normally moves the diaphragm to the horizontal position as shown in Figures 1, 2 and 3.

The valve seat is connected to a stem 22 which may be utilized when desired for lifting the valve seat and flexing the diaphragm 19. The diaphragm 19 divides the chamber 20, and the lower portion of the chamber 20ª is connected through a passage 23 and this passage 23 is in turn connected with the return pipe or line 24 leading from the exhaust or return side of a piston motor to be fluid operated. This pipe is connected to the supply reservoir for the fluid. Reference to the return pipe or line 24 as an exhaust is necessarily limited to its function of exhausting the pressure fluid from the low side of one of the operating motors to the supply reservoir as shown on Fig. 3 and hence in closed circuit to the customary pump for recirculation. It is not equivalent to atmospheric pressure and manifestly is greater than atmospheric pressure and the spring tension when the diaphragm is flexed.

Figure 3:
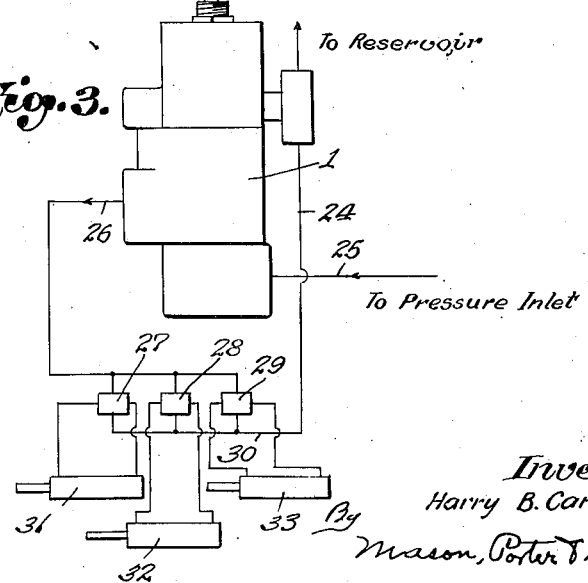
Figure 3 is a diagrammatic view showing the shut-off valve as connected through selector valves to piston operated parts.

As shown in Figure 3 the shut-off valve 1 is shown diagrammatically connected to a pipe 25, which in turn is connected to a source of fluid pressure. The outlet is connected to a pipe 26, which in turn is connected to a series of selector valves 27, 28 and 29. The selector valves are in turn connected to a common exhaust line 30, and this exhaust line is connected to the pipe 24.

There is also illustrated in Figure 3, a piston motor 31 of the usual type having the opposite ends of the cylinder therefor connected to the selector valve 27. There is also a piston motor 32 connected to the selector valve 28 and a piston motor 33 connected to the selector valve 29. The selector valves and piston operated motors are all of the usual construction and further description thereof is not thought necessary.

When all of the selector valves are closed then the automatic shut-off valve will be in the position shown in Figure 1. There can be no flow of fluid through the outlet and, therefore the fluid pressure on the valve will be greater on the upper side of the valve than the lower because of the increased area, and additional action of the spring, so that the valve will be held tightly closed.

When it is desired to operate a selected motor the selector valve is opened and immediately the fluid pressure on the line will move the main valve 8 to the position shown in Figure 4. The passage 17 through the pilot valve is of larger capacity than the passage 9 through the main valve and, therefore, as soon as the selector valve is open so that fluid can flow from the chamber above the main valves, it will flow from this chamber freely through passage 13 at a faster rate than it can be replenished through the passage 9, and this will create a differential in the pressure on the main valve sufficient to initially open the same. During this initial opening of the main valve the pilot valve will also be moved upwardly, but this upward movement will be relatively slow.

The fluid returning from the motor will create a pressure against the diaphragm 19 which will overcome the spring bearing thereon, and this will raise the valve seat 18 to the position shown in Figure 5. The valve seat is still spaced away from the upper end of the pilot valve so that the differential pressure on the main valve continues and the main valve will be maintained by fluid pressure in its full open position so long as there is a flow of fluid pressure through the exhaust or return pipe 24 which exerts a pressure on the diaphragm to hold it in its flexed position. Should, however, a line break leading from the exhaust of the operating piston motor, or a leak start which is very excessive in the exhaust of said motor, the flow will cease or almost cease, whereupon the spring 21, associated with the diaphragm 19, will force the diaphragm downward to horizontal position, and this will cause the auxiliary valve seat 18 to close the opening through the pilot valve.

As soon as the opening through the pilot valve is closed then a pressure will build up in the chamber 10 above the main valve by reason of flow of fluid through the passage 9, and this will cause the main valve to immediately close.

If it is desired to operate the motor notwithstanding that the exhaust or return therefrom will be lost, the stem 22 may be lifted, which will move the valve seat away from the pilot valve and this will at once cause a differential in the pressure bearing on the main valve, so that the fluid pressure against the underface thereof will open the valve.

After the main valve is closed because of a broken line, the parts will be in the position shown in Figure 2, and it will be necessary to pull up on the stem 22 and unseat the pilot valve so that when another selected valve is operated the main valve can be opened by the fluid pressure thereagainst.

If, however, the selector valve is closed in order to stop the operation of the piston motor then the diaphragm 19 which was flexed as shown in Figure 5 will be returned to the position shown in Figure 1. Fluid pressure will build up on the main valve and the pilot valve so that the pilot valve will return to the position shown in Figure 1, and the main valve will close.

It will be noted that when a selector valve is open, a main valve is initially opened by the fluid pressure bearing directly thereagainst. This is accomplished by reason of the fact that the pilot valve is normally open, and remains open so long as fluid is flowing to and from the piston motor. This pilot valve is only closed when an exhaust or return pipe is broken so that the fluid pressure holding the seat away from the pilot valve permits the seat to move to close the pilot valve.

It is obvious that many changes in the details of construction and the arrangement of parts may be made without departing from the spirit of the invention as set forth in the appended claims.

I claim:

1. An automatic shut-off valve for a fluid pressure operated motor comprising a casing having a valve chamber, inlet and outlet passages connected to one side of said chamber, a main valve in the chamber for controlling flow from the inlet to the outlet, said valve having a passage therethrough in constant connection with the inlet passage whereby said valve is subjected to fluid pressure on both sides thereof, means controlled by the pressure of the return flow of fluid from the motor for creating a differential in the fluid pressure on the opposite sides of the valve for opening said valve, and means responsive to abnormal drop of pressure in the return fluid flow from the motor to restore a balance of pressure on the valve for closing the same.

2. An automatic shut-off valve for a fluid pressure operated motor comprising a casing having a valve chamber, inlet and outlet passages connected to one side of said chamber, a main valve in the chamber for controlling flow from the inlet to the outlet means for holding said valve normally closed, said valve having a passage therethrough in constant connection with the inlet passage whereby said valve is subjected to fluid pressure on both sides thereof, an auxiliary outlet passage connected to the other side of the valve chamber, a pilot valve between said outlet and said chamber, means to hold said pilot valve normally open whereby flow of fluid from the outlet will create a differential pressure on opposite sides of the main valve for forcing said valve to open position, and means responsive to abnormal drop of return fluid flow from the motor to create a balance of pressure on the main valve enabling it to close.

3. An automatic shut-off valve for a fluid pressure operated motor comprising a casing having a valve chamber, inlet and outlet passages connected to one side of said chamber, a main valve in the chamber for controlling flow from the inlet to the outlet means for holding said valve normally closed, said valve having a passage therethrough in constant connection with the inlet passage whereby said valve is subjected to fluid pressure on both sides thereof, an auxiliary outlet passage connected to the other side of the valve chamber, a pilot valve between said auxiliary outlet and the chamber, means to hold said pilot valve normally open whereby flow of fluid from the outlet will create a differential pressure on the main valve for moving the same to open position and whereby when the flow from the outlet is arrested a balance of pressure is created on the main valve to enable it to close, and means responsive to abnormal drop of return fluid flow from the motor to restore a balance of pressure on the opposite sides of the main valve enabling it to close.

4. An automatic shut-off valve for a fluid pressure operated motor comprising a casing having a valve chamber, inlet and outlet passages connected to one side of said chamber, a main pressure released valve in the chamber for controlling flow from the inlet to the outlet means for holding said valve normally closed, said valve having a passage therethrough in constant connection with the inlet passage whereby said valve is subjected to fluid pressure on both sides thereof, an auxiliary outlet passage connected to the other side of said valve chamber, a pilot valve between said auxiliary outlet and said chamber, a movable valve seat for said pilot valve, means to hold said pilot valve normally open, and means responsive to abnormal drop of return fluid flow for moving said valve seat into contact with the pilot valve for closing the same when the return flow of fluid from the motor ceases to restore a balance of opposing fluid pressure on the main valve and to permit the same to move to closed position.

5. An automatic shut-off valve for a fluid pressure operated motor comprising a casing having a valve chamber, inlet and outlet passages connected to one side of said chamber, a main pressure released valve in the chamber for controlling flow from the inlet to the outlet means for holding said valve normally closed, said valve having a passage therethrough in constant connection with the inlet passage whereby said valve is subjected to fluid pressure on both sides thereof, an auxiliary outlet passage connected to the other side of said valve chamber, a pilot valve between said auxiliary outlet and said chamber, a movable valve seat for said pilot valve, means to hold said pilot valve normally open, and means responsive to abnormal drop of return fluid flow for moving said valve seat into contact with the pilot valve for closing the same when the return flow of fluid from the motor ceases to restore a balance of opposing fluid pressure on the main valve and to permit the same to move to closed position, and manual means for shifting the valve seat away from the pilot valve for permitting the main valve to be opened and the fluid to flow to the motor.

6. An automatic shut-off valve for a fluid pressure operated motor comprising a casing having a valve chamber, inlet and outlet passages connected to one side of said chamber, a main valve in the chamber for controlling flow from the inlet to the outlet, a fluid passage connecting the inlet passage with the upper side of said valve whereby said valve is subjected to fluid pressure on both sides thereof, means controlled by the pressure of the return flow of fluid from the motor for creating a differential in the fluid pressure on the opposite sides of the valve for opening said valve, and means responsive to abnormal drop of pressure in the return fluid flow from the motor to restore a balance of pressure on the valve for closing the same.

7. An automatic shut-off valve for a fluid pressure operated motor comprising a casing having a valve chamber, inlet and outlet passages connected to one side of said chamber, a main valve in the chamber for controlling flow from the inlet to the outlet, means for holding said valve normally closed, a fluid passage connecting the inlet passage with the upper side of said valve whereby said valve is subjected to fluid pressure on both sides thereof, an auxiliary outlet passage connected to the other side of the valve chamber, a pilot valve between said outlet and said chamber, means to hold said pilot valve normally open whereby flow of fluid from the outlet will create a differential pressure on opposite sides of the main valve for forcing said valve to open position, and means responsive to abnormal drop of return fluid flow from the motor to create a balance of pressure on the main valve enabling it to close.

HARRY B. CARBON.

REFERENCES CITED

The following references are of record in the file of this patent:

UNITED STATES PATENTS

| Number | Name | Date |
|---|---|---|
| 474,244 | Hanson | May 3, 1892 |
| 489,515 | Wood | Jan. 10, 1893 |
| 1,172,421 | Beck | Feb. 22, 1916 |
| 1,627,628 | Anderson | May 10, 1927 |
| 1,724,891 | Anderson | Aug. 20, 1929 |
| 2,004,145 | Wineman | June 11, 1935 |